(12) United States Patent
Forge et al.

(10) Patent No.: US 10,310,116 B2
(45) Date of Patent: Jun. 4, 2019

(54) METHOD FOR DETERMINING A STACKED MODEL DESCRIBING ARCHITECTURAL ELEMENTS

(71) Applicant: TOTAL SA, Courbevoie (FR)

(72) Inventors: Aurèle Forge, Pau (FR); Vincent Henrion, Pau (FR); Pierre Biver, Pau (FR)

(73) Assignee: Total SA, Courbevoie (FR)

( * ) Notice: Subject to any disclaimer, the term of this patent is extended or adjusted under 35 U.S.C. 154(b) by 776 days.

(21) Appl. No.: 14/889,933

(22) PCT Filed: May 7, 2013

(86) PCT No.: PCT/IB2013/001154
§ 371 (c)(1),
(2) Date: Nov. 9, 2015

(87) PCT Pub. No.: WO2014/181145
PCT Pub. Date: Nov. 13, 2014

(65) Prior Publication Data
US 2016/0116618 A1    Apr. 28, 2016

(51) Int. Cl.
*G01V 1/30* (2006.01)
*G01V 1/28* (2006.01)
*G01V 99/00* (2009.01)

(52) U.S. Cl.
CPC ............ *G01V 1/301* (2013.01); *G01V 1/282* (2013.01); *G01V 99/005* (2013.01); *G01V 2210/661* (2013.01)

(58) Field of Classification Search
CPC ...... G01V 1/301; G01V 1/282; G01V 99/005; G01V 2210/661
See application file for complete search history.

(56) References Cited

U.S. PATENT DOCUMENTS

| 2013/0110484 A1 | 5/2013 | Hu et al. |
| 2015/0219793 A1* | 8/2015 | Li ................. G01V 99/005 703/2 |

FOREIGN PATENT DOCUMENTS

FR    2 938 952 A1    5/2010

OTHER PUBLICATIONS

Pickering et al., "Architectural element analysis of turbidite systems, and selected topical problems for sand-prone deep-water systems," Atlas of Deep Water Environments, 1985, 10 pages.*

(Continued)

*Primary Examiner* — Paul D Lee
*Assistant Examiner* — Mark I Crohn
(74) *Attorney, Agent, or Firm* — Patterson Thuente Pedersen, P.A.

(57) ABSTRACT

The present invention relates to a method for determining a stacked model describing architectural elements from a plurality of architectural element. The method comprises selecting an architectural element, determining merged zone, the merged zone being function of the zone of the selected architectural element and zones of related architectural elements, determining a probabilistic zone, the probabilistic zone being a function of the merged zone, and determining a probabilistic superposition value associated with the determined probabilistic zone, the probabilistic superposition value being a function of the superposition value of the selected architectural element. The previous steps are repeated for each architectural element in the plurality of architectural elements. The method further comprises stacking every determined probabilistic zone in a stacked model according to the determined probabilistic superposition value associated therewith, and providing the stacked model.

10 Claims, 12 Drawing Sheets

(56) References Cited

OTHER PUBLICATIONS

PCT International Search Report for PCT/IB2013/001154, dated Jan. 15, 2014, 3 pgs.
Pranter M J et al: "Deepwater Reservoir Modeling Using Sequence-Stratigraphic and Geomorphic Constraints", SPE Annual Technical Conference and Exhibition,, No. SPE 95952, Oct. 9, 2005 (Oct. 9, 2005), pp. 1-11, XP007922463.
Hongmei Li and Jef Caers: "Hierarchic Modeling and History Matching of Multiscale Flow Barriers in Channelized Reservoirs", SPE Annual Technical Conference and Exhibition,, No. SPE 109252, Nov. 11, 2007 (Nov. 11, 2017), pp. 1-11, XP007922462.

\* cited by examiner

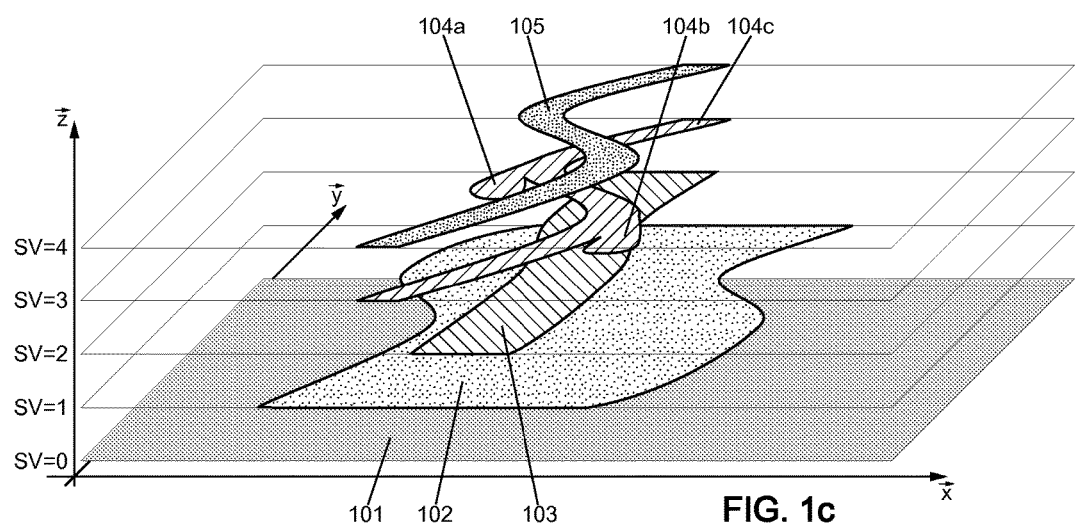

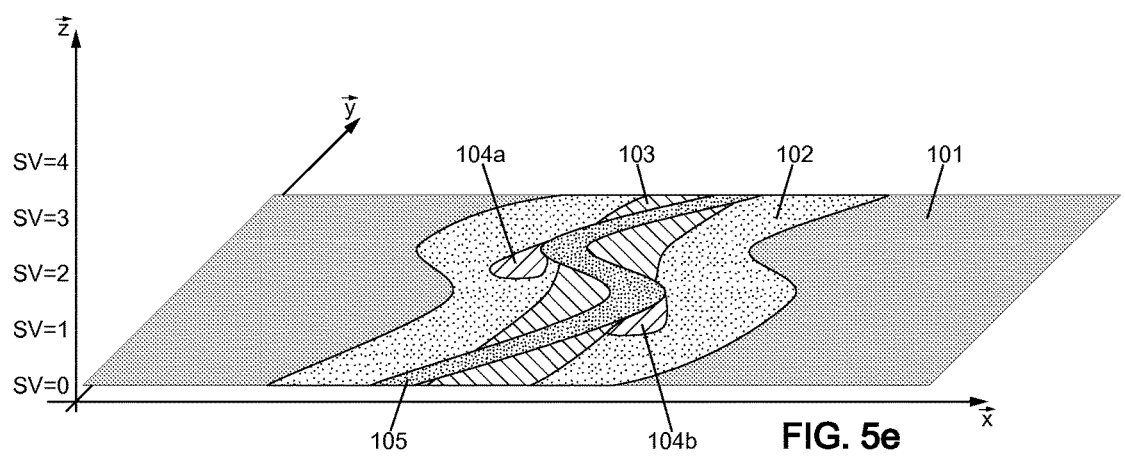

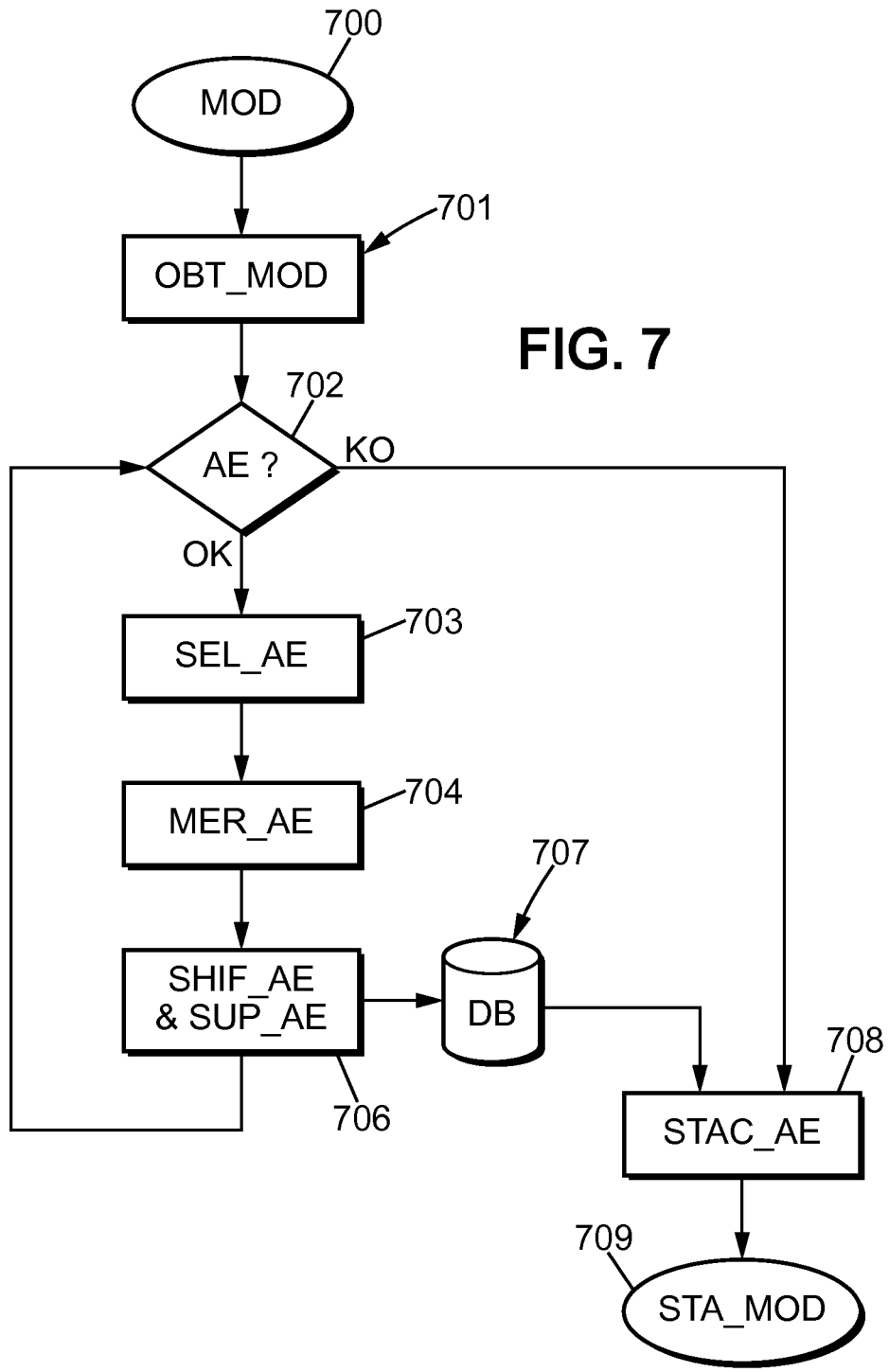

METHOD FOR DETERMINING A STACKED MODEL DESCRIBING ARCHITECTURAL ELEMENTS

RELATED APPLICATIONS

The present application is a National Phase entry of PCT Application No. PCT/IB2013/001154, filed May 7, 2013, said application being hereby incorporated by reference herein in its entirety.

FIELD OF THE INVENTION

The invention relates to geological models and more specifically to a method for determining a stacked model describing architectural elements.

BACKGROUND OF THE INVENTION

The present invention relates to the determination of consistent architectural elements in geological models.

Architectural elements have been first defined by Pickering et al. in 1998 as an interpretive characterization of a sedimentary feature distinguished on the basis of its geometry, scale and facies.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Architectural elements determination is important for modeling petroleum, oil and/or gas reservoirs. Thus, determination of limits and contours of architectural elements is a key point for geologists.

After a discovery of a reservoir, petroleum engineers and/or geologists seek to build a clear picture of the accumulation. Most of the time, the first stage is to conduct a seismic survey to determine the possible size of the trap and to estimate the volume of oil bearing reservoir. Geologists, geophysicists and reservoir engineers work together to build a model which enables simulations (for instance, simulation of the flow of fluids in the reservoir) leading to improved estimates of oil/gas reserves.

Nevertheless, the seismic survey does not always provide data and images that enable a clear cut determination of the architectural elements and, then, do not always enable a clear cut determination of the size/configuration of the trap.

For instance, the seismic data may be "blurred" and contours of the architectural elements may be uncertain for the interpreters (geologists or reservoir engineers).

When several architectural elements are very close/in contact, it may be difficult to adapt their limits/contour in a coherent manner.

Stochastic methods may be used to modify the contours of architectural elements. Nevertheless, modifications of contours of architectural elements may create an inconsistent model regarding geological logic.

For instance, a first architectural element may have to be included in a second architectural element (e.g. a stream channel and the bed of the channel). Moreover, a first architectural element may have to be in contact with a second architectural element (e.g. a splay and the bed of a channel).

Therefore, the modification of the contours of the first/second architectural element should not violate these rules.

There is thus a need for consistently determining contours of architectural elements in a geological model.

SUMMARY OF THE INVENTION

The invention relates to a method for determining a stacked model describing architectural elements from a plurality of architectural elements in a provided two or three dimensional geological model of a real subsoil, having a plurality of points, each architectural element comprising:
  a superposition value,
  a set of related architectural elements, the related architectural elements being in the plurality of architectural elements, and
  a geological zone comprising a set of points of the geological model,
the method comprising:
  /a/ selecting an architectural element in the plurality of architectural elements,
  /b/ determining a merged zone, the merged zone being function of the zone of the selected architectural element and zones of related architectural elements in the set of the selected architectural element;
  /c/ determining a probabilistic zone, the probabilistic zone being a function of the merged zone;
  /d/ determining a probabilistic superposition value associated with the determined probabilistic zone, the probabilistic superposition value being a function of the superposition value of the selected architectural element;

Steps /a/, /b/, /c/ and /d/ are repeated for each architectural element in the plurality of architectural elements.

The method further comprises:
  /e/ stacking every determined probabilistic zone in a stacked model according to the determined probabilistic superposition value associated therewith;
  /f/ providing the stacked model.

Thus, it is possible to facilitate the creation of models consistent with geological criteria without complex computations.

A "zone" (merged, probabilistic, etc.) may comprise a plurality of points of the model. Consequently, it is possible to define a contour of any model as a closed line that defines the smallest area in the model and comprises all the points of the zone.

"Stacking" a plurality of zones in a model may consist in a set of models (each model comprising a single zone), the plurality of models being ordered according to a stack order (or "superposition order").

The stacked model may ease construction of a 2D geological model with consistent architectural element. For instance, a flattening process that combines the models of the set according to the stacked order may be used.

Advantageously, each superposition value of the architectural element in the plurality of architectural elements may be different.

In a possible embodiment, at least one set of related architectural elements comprises at least one element.

According to another embodiment, the merged zone may be determined by combining the zone of the selected architectural element and zones of related architectural elements in the set of the selected architectural element.

The combination may be the union of the zones of the model being inside the selected architectural element or inside one of the related architectural elements.

Moreover, determining a probabilistic zone may comprise:
- for each point of the merged zone, associating an initial probability value to 1;
- for each point of the model and not of the merged zone, associating an initial probability value to 0;
- for each point of the model, selecting the point and computing a final probability value, the computation comprising a mean of initial probability values of points in a window around the selected point;
- determining a stochastic value;

The probabilistic zone may then comprise points of the model having a final probability value above the stochastic value.

Then the probabilistic zone does not comprise any point having a final probability value below the stochastic value.

The window may be centred on the selected point. A window may be defined as points as being close to the selected point according to a given norm (i.e. the distance between the selected point and the points in the window is less than a predetermined distance according to a distance). The distance may be for instance a Euclidian distance (circle shape) or a Chebyshev distance (square shape).

In one embodiment, the merged zone may be associated with:
- a maximum contour associated with a maximum probability value $p_{max}$, and
- a minimum contour associated with a minimum probability value $p_{min}$.

Then determining a probabilistic zone may comprise:
- for each point between the minimum contour and the maximum contour, associating a final probability value in the interval $]p_{min}; p_{max}[$;
- determining a stochastic value.

The probabilistic zone may also comprise points of the model having a final probability value above the stochastic value.

Then the probabilistic zone does not comprise any point having a final probability value below the stochastic value.

In a different embodiment, associating a final probability value in the interval $]p_{min}; p_{max}[$ may comprise:
- determining the minimal distance $d_{min}$ from the point to the minimum contour;
- determining the minimal distance $d_{max}$ from the point to the maximum contour;
- associating to the point a final probability value being a function of $$p(x) = \frac{d_{max}}{d_{max} + d_{min}} p_{min} + \frac{d_{min}}{d_{max} + d_{min}} p_{max}.$$

In one embodiment, the probabilistic superposition value may be equal to the superposition value of the selected architectural element.

Another aspect of the invention relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Another aspect of the invention relates to a device for determining a stacked model describing architectural elements from a plurality of architectural elements in a provided two dimensional geological model having a plurality of points.

Each architectural element comprises:
- a superposition value,
- a set of related architectural elements, the related architectural elements being in the plurality of architectural elements, and
- a geological zone comprising a set of points of the geological model, The device comprises:
- a circuit,
- a memory having stored thereon a computer program comprising program instructions, the computer program being loadable into a circuit and adapted to cause the circuit to carry out the steps of the method described above when the computer program is run by the circuit,
- an interface for providing the stacked model.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which:

FIG. 1c is a second representation of a geological model derived from the image of FIG. 1a wherein each architectural element has a different superposition value;

FIG. 4 is a representation of a probability map according to a maximum and minimum contour;

FIGS. 5a to 5e describe a stacking process for a plurality of architectural elements;

FIG. 7 is a flow chart describing an embodiment of the present invention.

DETAILED DESCRIPTION OF THE DRAWINGS

Figure 1A:
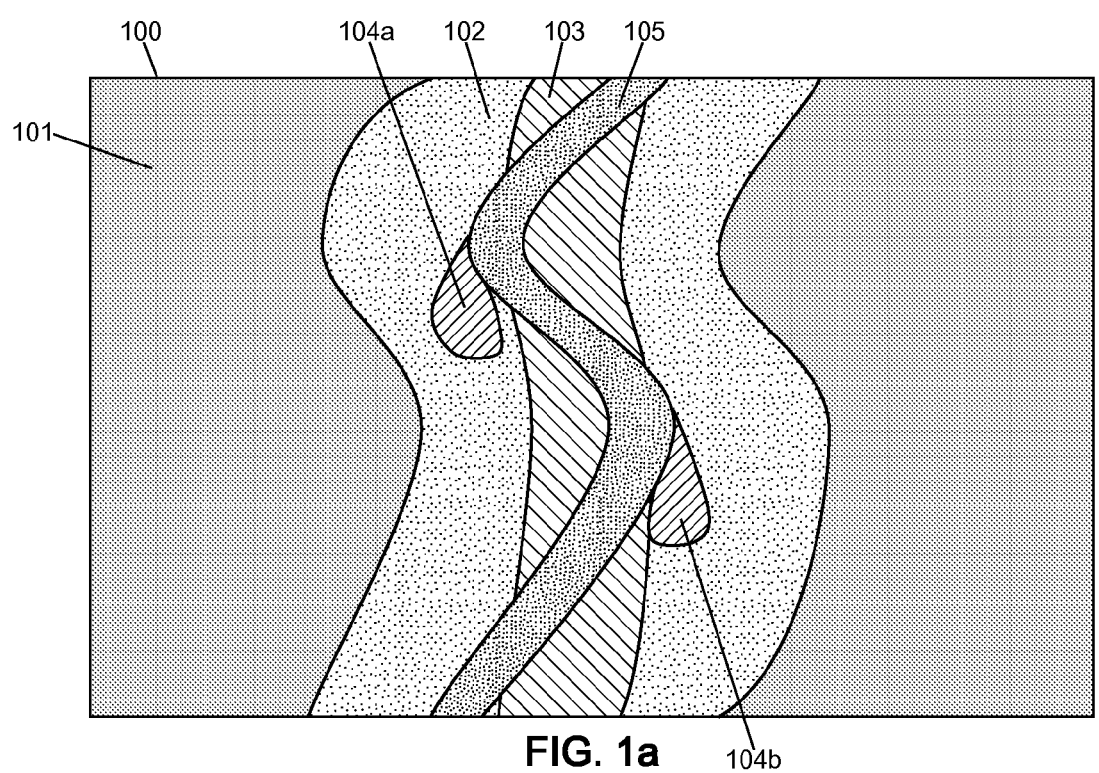
FIG. 1a is a representation of a seismic image in which architectural elements are represented.

FIG. 1a is a possible representation of a seismic image in which architectural elements are represented. In this representation, six architectural elements 101, 102, 103, 104a, 104b and 105 may have been described by interpreters (e.g. geologists).

For instance, architectural elements of FIG. 1a may be representative of sedimentation in a former river region.

Figure 1B:
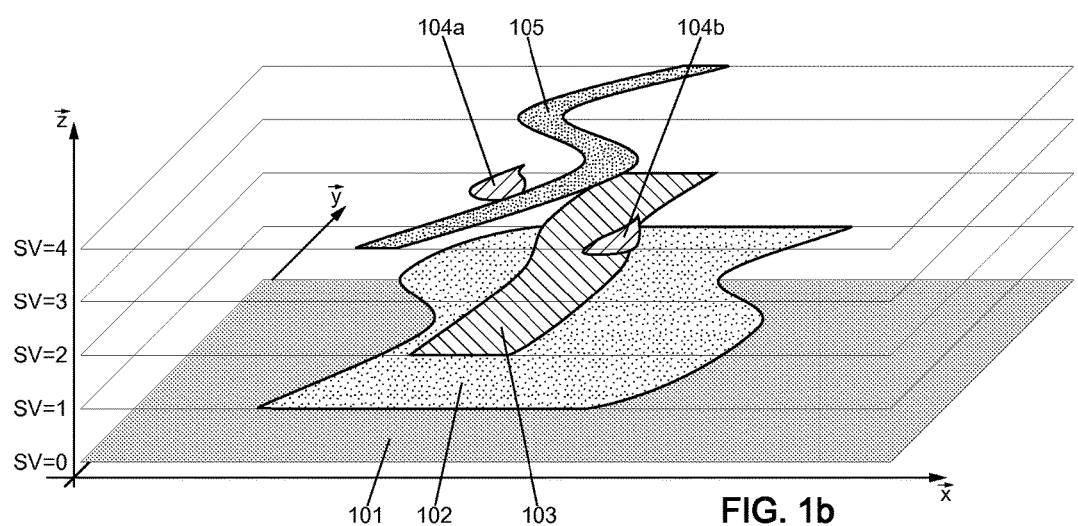
FIG. 1b is a first representation of a geological model derived from the image of FIG. 1a wherein each architectural element has a different superposition value.

FIG. 1b is a first representation of a geological model derived from the image of FIG. 1a wherein each architectural element has a different superposition value.

After analyzing the seismic image, interpreters may consider that some architectural elements have been formed after, in the geologic time, other identified architectural elements. Therefore, for each architectural element, a superposition value is being associated therewith in order to reflect the different times of sedimentation.

For instance, a different z-coordinate (according to the $\vec{z}$ axis) may be associated with each architectural elements. In FIG. 1b:
- architectural element 101 has the lowest superposition value (i.e. SV=0). It may also be referred to "the background architectural element". Architectural element 101 reflects a first group of sediments that had formed a deposit.
- architectural element 102 has a superposition value SV=1. This architectural element reflects a second group of sediments that had formed a deposit after the first group.
- architectural element 103 has a superposition value SV=2. This architectural element reflects a third group of sediments that had formed a deposit after the first group and the second group.
- architectural elements 104a and 104b (referred also as 104) have a superposition value SV=3. These architectural elements reflect a fourth group of sediments that had formed a deposit after the first group, the second group and the third group.
- architectural element 105 has a superposition value SV=4. This architectural element reflects a fifth group of sediments that had formed a deposit after the first group, the second group, the third group and the fourth group.

FIG. 1c is a second representation of a geological model derived from the seismic image of FIG. 1a wherein each architectural element has a different superposition value. Indeed, it is noted that, starting with a single seismic image/set of data, many possible decompositions in architectural elements are possible.

In this Figure, the fourth group of sediments further comprises an architectural element 104c which is under the architectural element 105 and has similar contours.

Indeed, it is possible that a first architectural element "hides" a part of second architectural element in the seismic image so that the second architectural element is seen as "splitted". Therefore, the interpreters may recreate the hidden part (i.e. 104c) in order to re-import into the model the missing information.

Then, it is possible to create a single architectural element 104 from the three architectural elements 104a, 104b and 104c.

Figure 2:
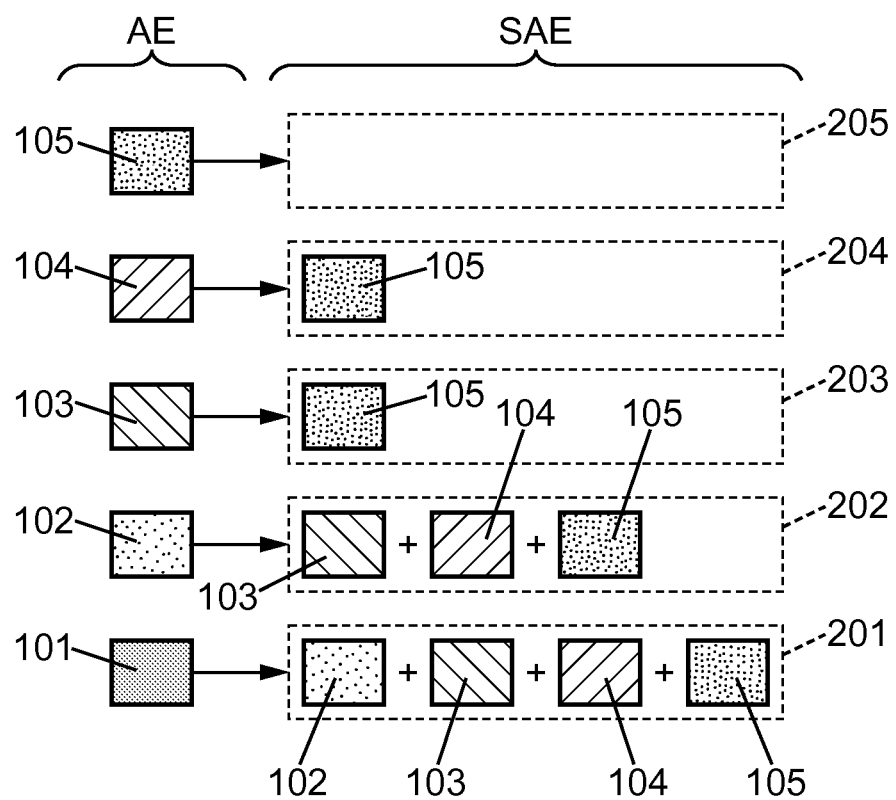
FIG. 2 is a representation of inclusivity relations between architectural elements.

FIG. 2 is a representation of inclusivity relations between architectural elements. Indeed, in order to improve the simulation results, it is advantageous to define inclusivity relations, for instance, in order to maintain contacts between contours of selected architectural element and to modify contours according to geological constraints.

As described above, the contours of architectural elements may be modified/shift during a simulation process: if no constraint is set, the contours may be modified so that some contours (that were initially in contact) may not be in contact at the end of the simulation process.

In order to avoid such side effects, and if the interpreters believes that it is a non-sense that two architectural elements were disconnected, the interpreters may setup inclusivity relations.

For instance, the interpreter may consider that the architectural element 104 (i.e. the group of architectural element 104a, 104b, etc. which represents the splays of a channel) should be connected to architectural element 105 (which represents a channel that has created the splays). Thus, a set of architectural elements 204 is created and this set comprises the single element 105.

It is noted that the inclusivity relations may not be bijective: in the present situation described in FIG. 2, the set of architectural elements 205 associated with element 105 does not contain element 104, and is empty). Advantageously, the elements being comprised in the set of architectural elements associated with a given element may have a superposition value (SV) higher than the superposition value of the given element.

The inclusivity relations may honor the erosion sequence in order not to allow low energy architectural elements to replace high energy architectural elements. In case of architectural elements contraction, some voids may appear. They may be filled by extrapolating less erosive facies, using for instance a nearest-neighbor interpolation method.

The architectural elements that belong to the same sedimentary system may "breathe" in the same way. Practically, the use of a same random draw (or random field) guarantees a correlated breathing. Correlated breathing may avoid the creation of too many voids.

Inclusivity relations may be defined to ensure the conservation of connections and geological consistency between architectural elements. For instance, in a fluvial environment, the channel 105 is included in the architectural elements "levees" 102. In that case, a merged architectural element may be the union of architectural elements channel 105 and the architectural elements "levees" 102. A shifting of the merged architectural element is simulated first and then is "eroded" by the channel architectural element.

In the situation described in FIG. 2, the interpreter has considered that:
- set 203 of architectural elements associated with element 103 should comprises element 105;
- set 202 of architectural elements associated with element 102 should comprises elements 105, 104 and 103;
- set 201 of architectural elements associated with element 101 should comprises elements 105, 104, 103 and 102.

Figure 3A:
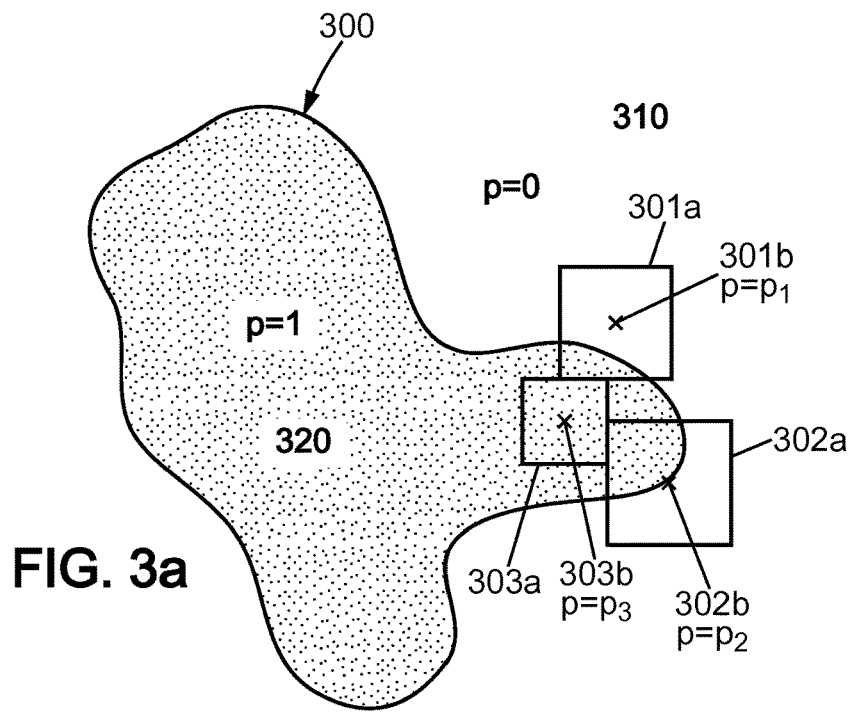
FIGS. 3a and 3b are a representation of a shifting of contours of an architectural element when only one single contour is provided for an architectural element.
Figure 3B:
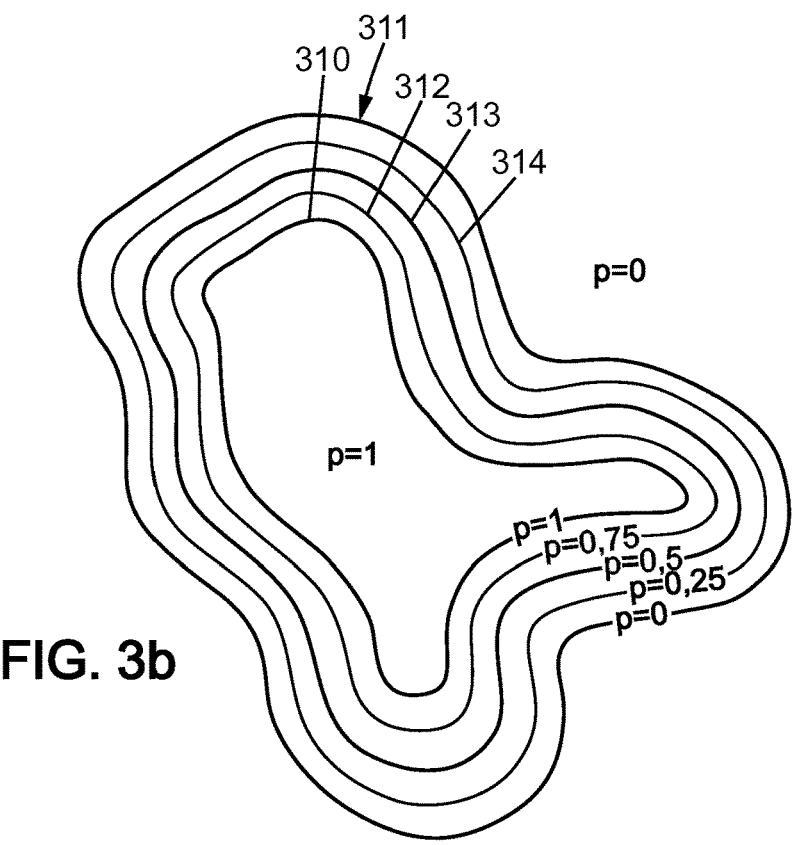

FIGS. 3a and 3b are a representation of a possible shifting of contours of an architectural element when only one single contour is provided for an architectural element. This shifting is also known as "architectural element breathing" (see P. Biver and V. Marlot. Architectural Elements Breathing & Flipping. Total, 2008). In this Figure, the model is a 2D model.

If only one contour 300 is available for each architectural element (as shown in FIG. 3a), each point the 2D model is associated with a set of boolean values: each boolean value corresponds to an architectural element.

The Boolean values associated with an architectural element are set to 0 if the point of the model is outside the architectural element (i.e. zone 310) and 1 if the point of the model is inside the architectural element (i.e. zone 320).

Moreover, a smoothing of these boolean values is performed by scanning a window over the model and averaging the boolean values inside the window. These smoothed values are interpreted as "probability values". In FIG. 3a:
- the probability for the point 301b is computed by averaging boolean values in the window 301a. The probability value $p_1$ of point 301b should be about 0.2 according to the dotted part of the window 301a.

the probability for the point 302b is computed by averaging boolean values in the window 302a. The probability value $p_2$ of point 302b should be about 0.4 according to the dotted part of the window 302a.

the probability for the point 303b is computed by averaging boolean values in the window 303a. The probability value $p_3$ of point 303b should be 1 according to the dotted part of the window 303a.

The size of the window may vary according to the space coordinates of the model. Moreover, the window may be a square as described in reference of FIG. 3a but it may also be a circle or any other geometrical shapes.

FIG. 3b is a representation of iso-probability lines after the computation of probability values as described above. In this Figure, five iso-probability lines are represented:
line 310 with a probability value p=1;
line 311 with a probability value p=0;
line 312 with a probability value p=0.75;
line 313 with a probability value p=0.5;
line 314 with a probability value p=0.25;

For each architectural element, a random number between 0 and 1 is drawn, for instance, according to a uniform law. Then, the new contour of the architectural element coincides with the iso-probability line with a probability value equal to this random number.

Therefore, the architectural element suffers a homogeneous spatial contraction or dilation. A random field can be used to obtain correlated spatial variations. The random field can be kriged to honor potential well data.

Figure 4:
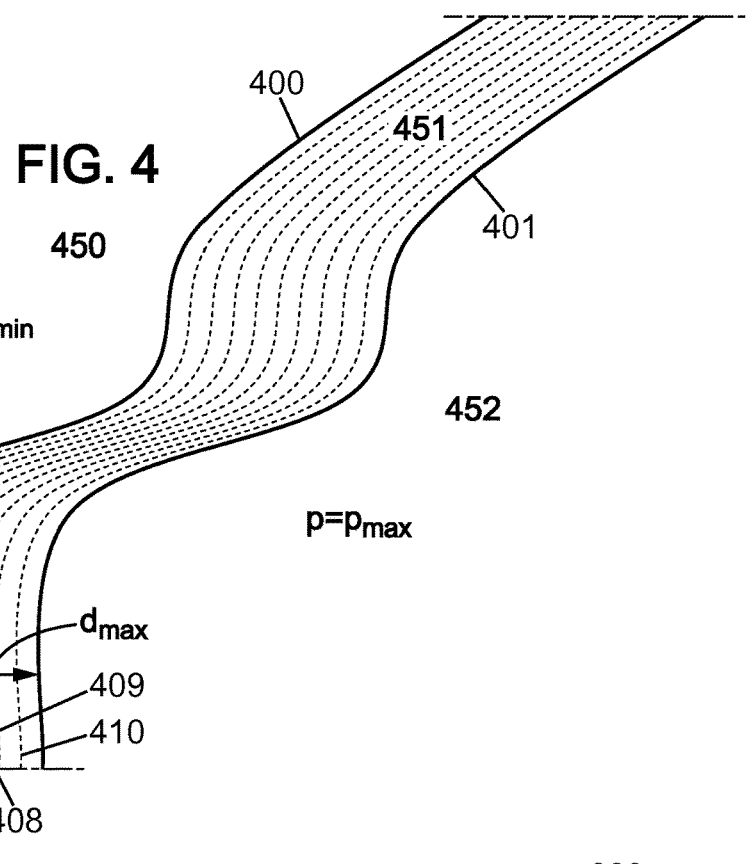
FIG. 4 is a representation of a shifting of contours of an architectural element when two contours are provided for an architectural element.

FIG. 4 is a representation of a possible shifting of contours of an architectural element when two contours 400 and 401 are provided for an architectural element. The contour 400 is associated with a probability $p=p_{min}$, corresponding to the minimal case: the minimum contour. The contour 401 is associated with a probability $p=p_{max}$, corresponding to the maximal case the maximum contour.

In such situation, three zones may be identified:
the internal zone 450 where the probability value of points is set to $p=p_{max}$,
the external zone 452 where the probability value of points is set to $p=p_{min}$,
a transition zone 451 where the probability value of points is interpolated.

The interpolation honors the following criteria:
1. respect of initial probability values $p_{min}$ and $p_{max}$;
2. continuity of the interpolated probability values;
3. monotony of the interpolated values, i.e. iso-probability lines do not cross over;
4. respect of ranges of values, i.e. the interpolated probability values are bounded by the two probability values $p_{min}$ and $p_{max}$, A solution to honor these criteria is to perform a linear distance-based interpolation in the transition zone. For a point x (point 450) in the transition zone, bounded by the two probabilities $p_{min}$ and $p_{max}$, the associated probability p(x) is computed by $$p(x) = \frac{d_{max}}{d_{max}+d_{min}} p_{min} + \frac{d_{min}}{d_{max}+d_{min}} p_{max}$$

with $d_{min}$ the shortest distance from the point x to the minimum contour 400 and $d_{max}$ the shortest distance from the point x to the maximum contour 401.

Because distance is a continuous and monotonous property, the resulting map is guaranteed to honor the above criteria. The resulting map will be derivable by region.

According to this method, it is possible to create iso-probability lines. If $p_{min}=0$ and $p_{max}=1$, it is possible to state that:
dashed line 402 is the iso-probability line for probability value p=0.1;
dashed line 403 is the iso-probability line for probability value p=0.2;
dashed line 404 is the iso-probability line for probability value p=0.3;
dashed line 405 is the iso-probability line for probability value p=0.4;
dashed line 406 is the iso-probability line for probability value p=0.5;
dashed line 407 is the iso-probability line for probability value p=0.6;
dashed line 408 is the iso-probability line for probability value p=0.7;
dashed line 409 is the iso-probability line for probability value p=0.8;
dashed line 410 is the iso-probability line for probability value p=0.9.

It is noted that the previous description may easily be adapted when n contours are provided: in such case, the same method is applied for two consecutive contours.

FIGS. 5a to 5e describe a merging process for a plurality of architectural elements. This merging process use the inclusivity relations presented in relation of FIG. 2.

The first step (see FIG. 5a) of the merging process is to select architectural element 105 and merged it with the architectural elements in the set associated therewith. As the set associated with architectural element 105 is empty, the merged architectural element is in fact the architectural element 105 itself. This merged architectural element is associated with a superposition value which is the superposition value of the architectural element 105, i.e. SV=4.

The second step (see FIG. 5b) of the merging process is to select architectural element 104 and merged it with the architectural elements in the set associated therewith, i.e. the architectural element 105. As the set associated with architectural element 104 comprises a single element 105, the merged architectural element is the combination of the architectural elements 105 and 104. This merged architectural element is associated with a superposition value which is the superposition value of the architectural element 104, i.e. SV=3.

A contour 501 of the merged element may thus be defined.

The third step (see FIG. 5c) of the merging process is to select architectural element 103 and merged it with the architectural elements in the set associated therewith, i.e. the architectural element 105. As the set associated with architectural element 103 comprises a single element 105, the merged architectural element is the combination of the architectural elements 105 and 103. This merged architectural element is associated with a superposition value which is the superposition value of the architectural element 103, i.e. SV=2.

A contour 502 of the merged element may thus be defined.

The fourth step (see FIG. 5d) of the merging process is to select architectural element 102 and merged it with the architectural elements in the set associated therewith, i.e. the architectural elements 103, 104 (104a+104b) and 105. As the set associated with architectural element 102 comprises elements 103, 104 and 105, the merged architectural element is the combination of the architectural elements 102, 103, 104 and 105. This merged architectural element is associated with a superposition value which is the superposition value of the architectural element 102, i.e. SV=1.

A contour 503 of the merged element may thus be defined.

The fifth step (see FIG. 5e) of the merging process is to select architectural element 101 and merged it with the architectural elements in the set associated therewith, i.e. the architectural elements 102, 103, 104 and 105. As the set associated with architectural element 101 comprises elements 102, 103, 104 and 105, the merged architectural element is the combination of the architectural elements 101, 102, 103, 104 and 105. This merged architectural element is associated with a superposition value which is the superposition value of the architectural element 101, i.e. SV=0. In such case, it is noted that the merged architectural element cover the entire model.

For each step described above in the first to fifth steps, the merged architectural element computed is selected and the breathing process is performed as described above (see FIG. 3a, 3b or 4).

At the end of such a process, five merged architectural elements have been computed and their contours have been shifted. These shifted and modified architectural elements associated with a superposition value may be referred as "a stacked model".

This stacked model may be flattened to obtain a single 2D model: to flatten the stacked model, each shifted and modified architectural elements may be considered as a layer image and zones outside the architectural elements may be considered as transparent. Then a standard flattening of layers in an image processing technique may be performed (for instance, see image processing software).

Figure 6:
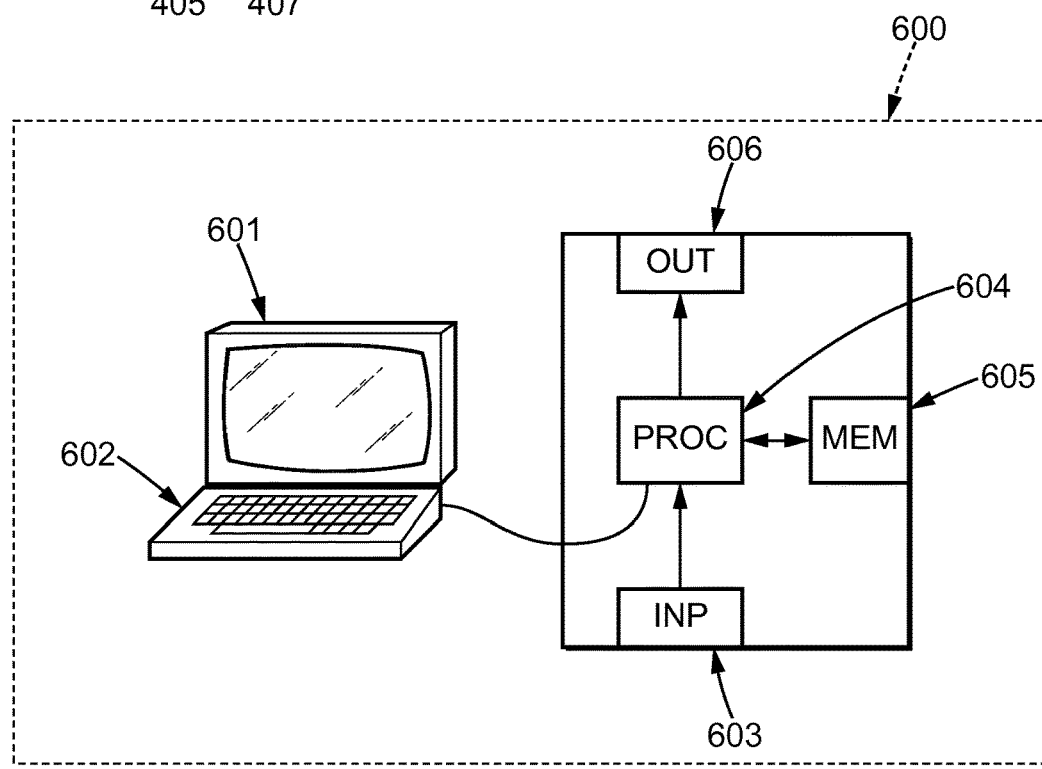
FIG. 6 is an embodiment for a device that enables the present invention.
Figure 5A:
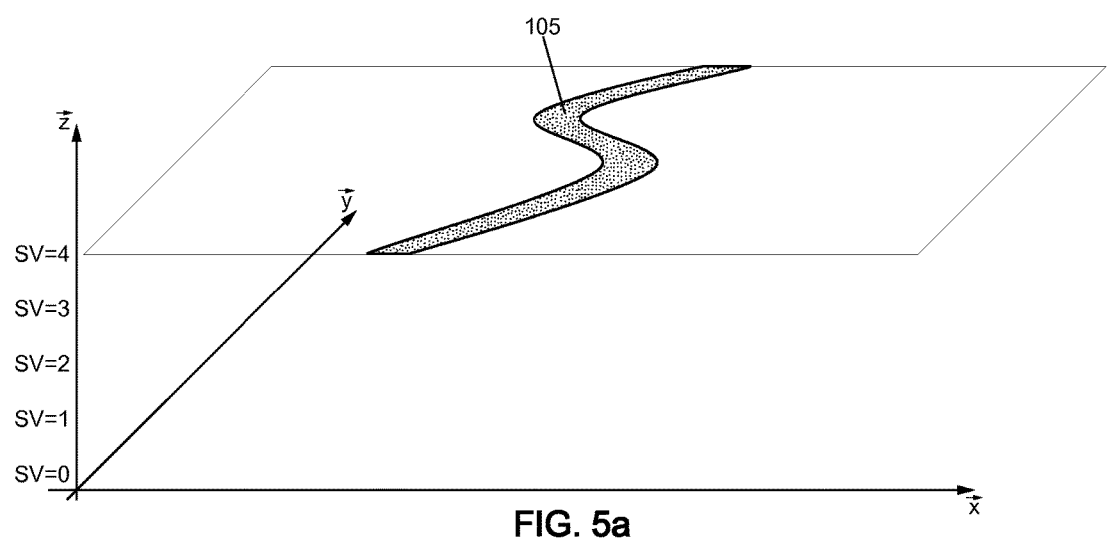
Figure 5B:
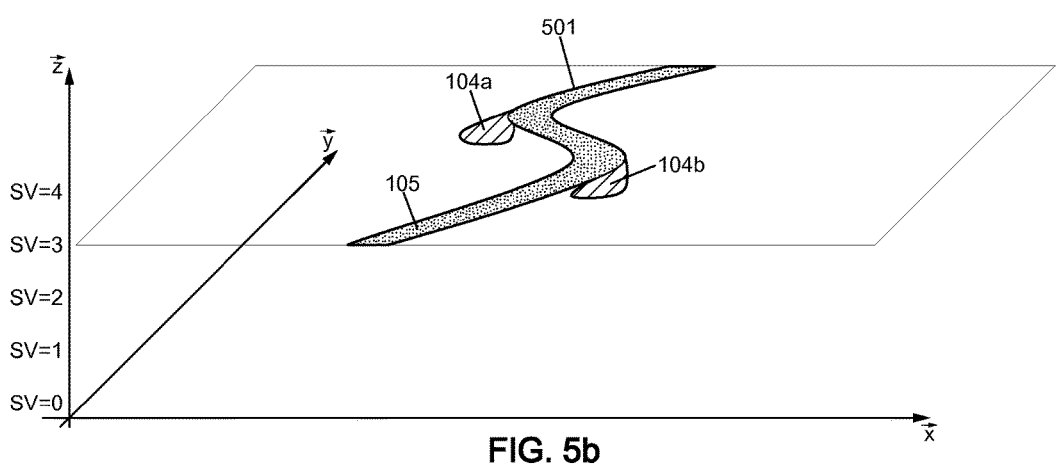
Figure 5C:
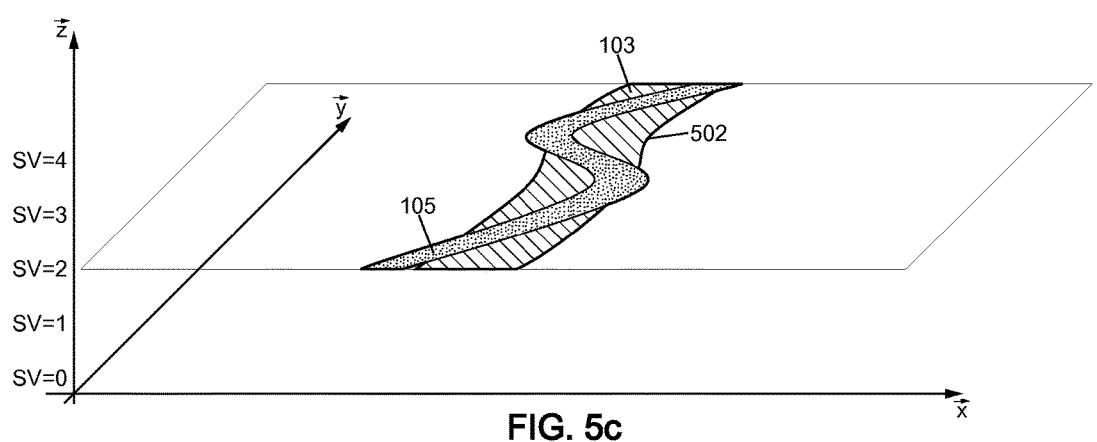
Figure 5D:
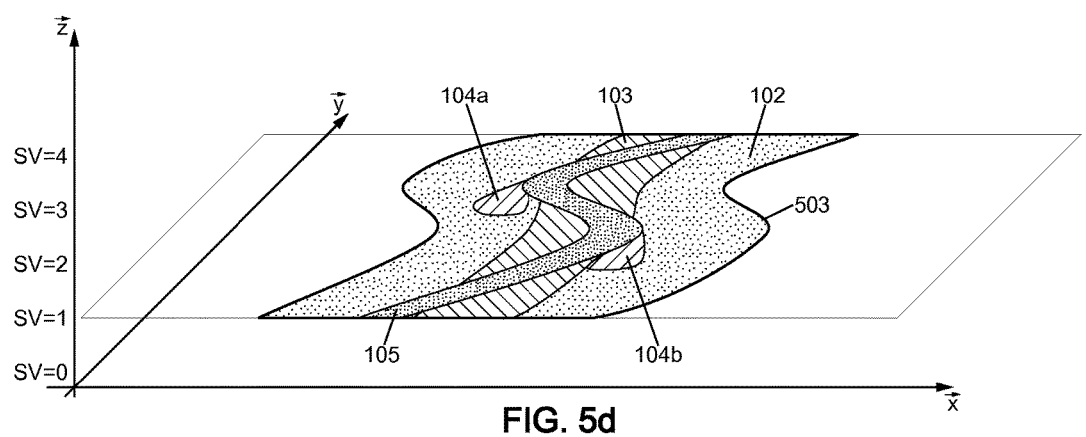

FIG. 6 is a possible embodiment for a device that enables the present invention.

In this embodiment, the device 600 comprise a computer, this computer comprising a memory 605 to store program instructions loadable into a circuit and adapted to cause circuit 604 to carry out the steps of the present invention when the program instructions are run by the circuit 604.

The memory 605 may also store data and useful information for carrying the steps of the present invention as described above.

The circuit 604 may be for instance:
 a processor or a processing unit adapted to interpret instructions in a computer language, or
 an electronic card wherein the steps of the invention are described within silicon, or
 a programmable electronic chip such as a FPGA chip (for «Field-Programmable Gate Array»).

This computer comprises an input interface 603 for the reception of data used for the above method according to the invention and an output interface 606 for providing a stacked model.

To ease the interaction with the computer, a screen 601 and a keyboard 602 may be provided and connected to the computer circuit 604.

FIG. 7 is a flow chart describing a possible embodiment of the present invention.

Upon reception (step 701) of a geological model 700 comprising a plurality of architectural elements, a simulation according to the present invention may be performed. Each architectural element comprises a superposition value (SV), a set of related architectural elements, and a geological zone.

If an architectural elements have not been processed (test 702, output OK), this architecture element is selected (step 703) and merged with the related architectural elements in the set of this architectural element (step 704).

Once the merge ends, the contours of the new merged architectural elements is modified/shifted (step 706) according for instance a shifting method described in relation of FIGS. 3a, 3b and 4. Moreover, a superposition value may be associated with the new shifted and merged architectural element as described above.

The new shifted and merged architectural element and its associated superposition value may be stored in a database 707 (in a memory for instance) for a future use.

If all architectural elements have been processed (test 702, output KO), the shifted and merged architectural elements may be retrieved with their superposition values from the database 707 and stacked (step 708) in a stacked model according their superposition values associated therewith.

Finally, the stacked model 709 may be outputted in order to be viewed by a user for instance on a display screen or modified by another process (for instance, a process that flatten the different architectural elements according to the stacking order so as to retrieve a single 2D model)

Part of this flow chart can represent steps of an example of a computer program which may be executed by the device described in FIG. 6.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A method for determining a stacked model describing architectural elements from a plurality of architectural elements in a provided two or three dimensional geological model of a real subsoil, having a plurality of points, each architectural element comprising:
 a superposition value,
 a set of related architectural elements, the related architectural elements being in the plurality of architectural elements, and
 a geological zone comprising a set of points of the geological model,
the method comprising:
 /a/ selecting an architectural element in the plurality of architectural elements,
 /b/ determining a merged zone, the merged zone being function of the zone of the selected architectural element and zones of related architectural elements in the set of the selected architectural element;
 /c/ determining a probabilistic zone, the probabilistic zone being a function of the merged zone;
 /d/ determining a probabilistic superposition value associated with the determined probabilistic zone, the probabilistic superposition value being a function of the superposition value of the selected architectural element;
wherein steps /a/, /b/, /c/ and /d/ are repeated for each architectural element in the plurality of architectural elements;
the method further comprising:

/e/ stacking every determined probabilistic zone in a stacked model according to the determined probabilistic superposition value associated therewith;
/f/ providing the stacked model; and
/g/ determining an estimate of oil/gas reserves in the subsoil based on said stacked model.

2. The method according to claim 1, wherein each superposition value of the architectural element in the plurality of architectural elements is different.

3. The method according to claim 1, wherein at least one set of related architectural elements comprises at least one element.

4. The method according to claim 1, wherein the merged zone is determined by combining the zone of the selected architectural element and zones of related architectural elements in the set of the selected architectural element.

5. The method according to claim 1, wherein determining a probabilistic zone comprises:
for each point of the merged zone, associating an initial probability value to 1;
for each point of the model and not of the merged zone, associating an initial probability value to 0;
for each point of the model, selecting the point and computing a final probability value, the computation comprising a mean of initial probability values of points in a window around the selected point;
determining a stochastic value;
and wherein the probabilistic zone comprises points of the model having a final probability value above the stochastic value.

6. The method according to claim 1, wherein, the merged zone being associated with
a maximum contour associated with a maximum probability value $p_{max}$, and
a minimum contour associated with a minimum probability value $p_{min}$,
wherein determining a probabilistic zone comprises:
for each point between the minimum contour and the maximum contour, associating a final probability value in the interval $]p_{min}; p_{max}[$;
determining a stochastic value;
and wherein the probabilistic zone comprises points of the model having a final probability value above the stochastic value.

7. The method according to claim 6 wherein associating a final probability value in the interval $]p_{min}; p_{max}[$ comprises:
determining the minimal distance $d_{min}$ from the point to the minimum contour;
determining the minimal distance $d_{max}$ from the point to the maximum contour;
associating to the point a final probability value being a function of $$p(x) = \frac{d_{max}}{d_{max}+d_{min}} p_{min} + \frac{d_{min}}{d_{max}+d_{min}} p_{max}.$$

8. The method according to claim 1, wherein, the probabilistic superposition value is equal to the superposition value of the selected architectural element.

9. A non-transitory computer readable storage medium, having stored thereon a computer program comprising program instructions, the computer program being loadable into a data-processing unit and adapted to cause the data-processing unit to carry out the method of claim 1 when the computer program is run by the data-processing device.

10. A device for determining a stacked model describing architectural elements from a plurality of architectural elements in a provided two dimensional geological model having a plurality of points, each architectural element comprising: a superposition value, a set of related architectural elements, the related architectural elements being in the plurality of architectural elements, and a geological zone comprising a set of points of the geological model, the device comprising: a circuit, a memory having stored thereon a computer program comprising program instructions, the computer program being loadable into a circuit and adapted to cause the circuit to carry out the method of claim 1 when the computer program is run by the circuit, an interface for providing the stacked model.

* * * * *

UNITED STATES PATENT AND TRADEMARK OFFICE
CERTIFICATE OF CORRECTION

| | | |
|---|---|---|
| PATENT NO. | : 10,310,116 B2 | Page 1 of 1 |
| APPLICATION NO. | : 14/889933 | |
| DATED | : June 4, 2019 | |
| INVENTOR(S) | : Forge et al. | |

It is certified that error appears in the above-identified patent and that said Letters Patent is hereby corrected as shown below:

On the Title Page

Item (57) Line 3, "element" should read --elements--

Signed and Sealed this
Twenty-eighth Day of January, 2020

Andrei Iancu
*Director of the United States Patent and Trademark Office*